Aug. 1, 1944. L. R. MEYRAN 2,354,822
PIE LIFTER
Filed Sept. 18, 1943
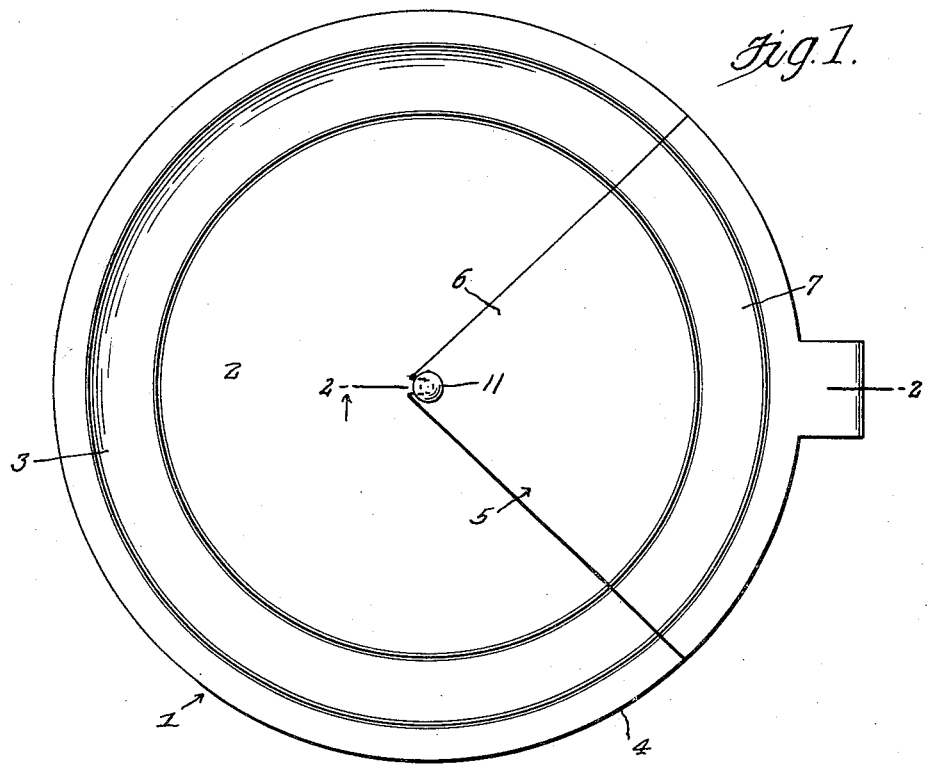
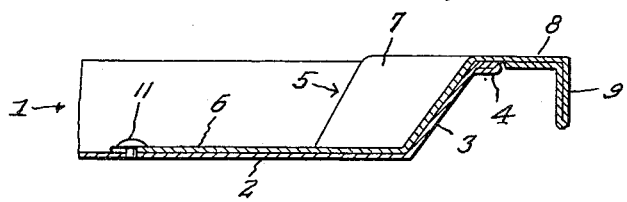
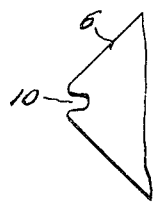
Inventor
Laura Rose Meyran
By Clarence A. O'Brien
and Harvey B. Jacobson
Attorneys Patented Aug. 1, 1944

2,354,822

UNITED STATES PATENT OFFICE 2,354,822

PIE LIFTER

Laura Rose Meyran, Fresno, Calif.

Application September 18, 1943, Serial No. 502,973

1 Claim. (Cl. 99—429)

My invention relates to improvements in pie pans or tins, and more especially to pie lifters therefor, the principal object in view being to equip such pans, or tins, inexpensively with a lifter device which is easily and quickly operated to lift cuts of pie out of the pans and which is easy to clean, and forms a component part of a pan, or tin, in baking.

Other and subordinate objects are also comprehended by my invention, all of which, together with the precise nature of my improvements, will be readily understood when the succeeding description and claim are read with reference to the drawing accompanying and forming part of this specification.

In said drawing:

Figure 1 is a view in top plan illustrating a pie pan, or tin, equipped according to my invention in its preferred embodiment, Figure 2 is a view in transverse section taken on the line 2—2 of Figure 1, and Figure 3 is a fragmentary view in plan illustrating the notch in the lifter section.

Referring to the drawing by numerals, according to my invention, the usual pie pan, or tin, 1 having a flat bottom 2, flaring sides 3, and horizontal rim flange 4, is provided with a sector-like lifter section 5 of tin or other suitable light metal, and which comprises a flat body portion 6 adapted to fit flat on the bottom 2 of the pan 1, a slanting rimmed flange 7 adapted to fit against the sides 3 and flange 4, and a right angled hand grip tab 8 extending horizontally and centrally outwardly of the flange 7 to overlie the rim flange 4, said tab 8 terminating outwardly of the flange 4 in a right angled handle 9 of double thickness of material for reinforcing purposes. The apex end of the lifter section 5 is provided with a notch 10 therein adapted to straddle a headed stud 11 provided in the bottom 2 of the pan 1 in the axis thereof.

The manner in which the described lifter section 5 is designed to be used and operated will be obvious. Preferably, the section 5 is lifted out of the pan 1 to lift a pie cut, or segment, out with the same, and then reinserted in the pan 1 and rotated around the stud 11 beneath another cut section to separate the same from the bottom 2 of the pan and to position the lifter section for another lifting operation. In removing the lifter section 5 from the pan, it is first tilted on its apex end so that the notch 10 may be withdrawn from beneath the head of the stud 11.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A pie pan comprising a bottom and a side wall, an axial headed stud arising from said bottom, and a lifter section of segmental form and sheet material fitting in said pan and having a notched apex end straddling said stud beneath the head thereof, and a flange fitting against said wall and provided with a handle extending over the rim of the pan, said handle terminating outwardly of said rim in a right angled portion of double thickness of the material and forming a downturned tab.

LAURA ROSE MEYRAN.